J. McGregor, Jr.,
Planing Machine,
7730X
Patented Aug. 28, 1833.
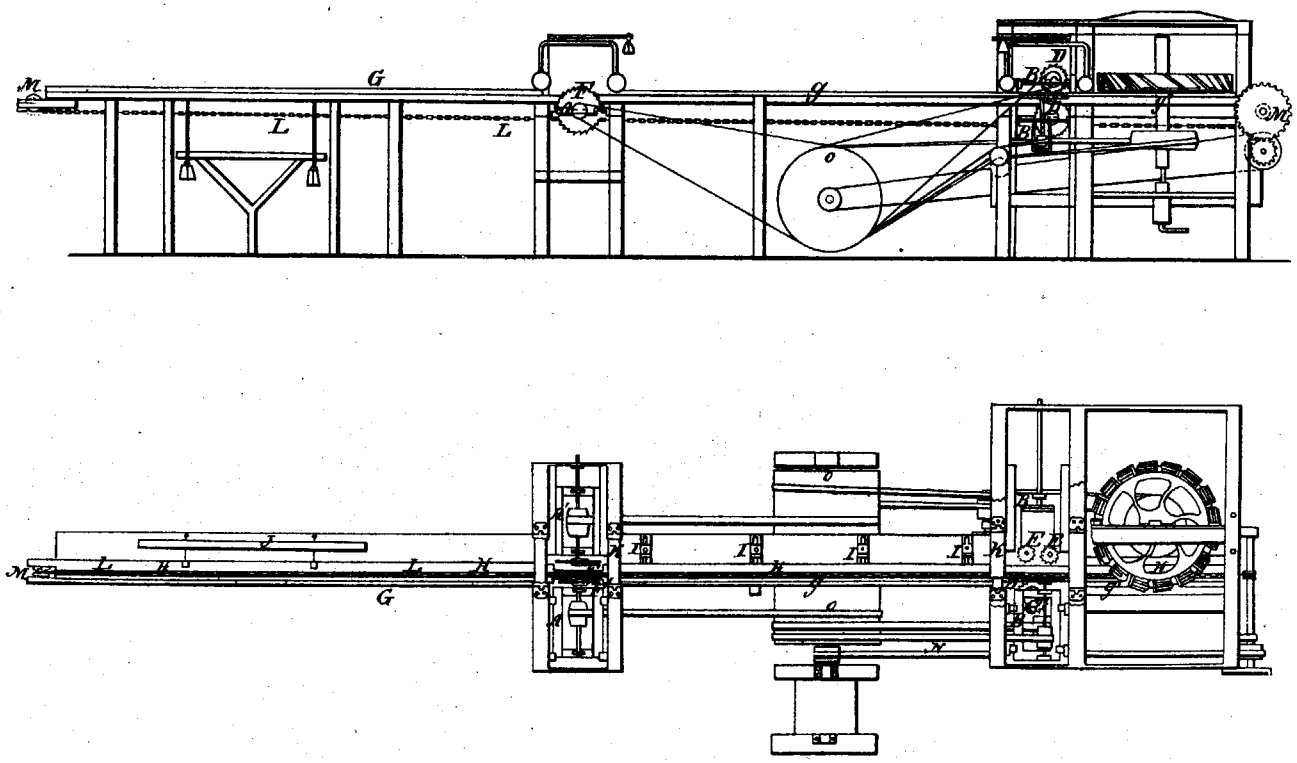
N. PETERS, PHOTO-LITHOGRAPHER, WASHINGTON, D. C.

7730 X 483.

Aug 28 1833

(Ably see yellow book)

* James MacGregor Junr. of Wilton Saratoga co New York, a Citizen of the United States

[illegible]

[illegible]

[illegible]

Improvement being a machine for jointing, tongueing, grooving & planing plank for flooring houses & for other purposes.

Date of Patent Aug 28. 1833

Do. certificate of Atty Genl Aug 28.

---

The Schedule referred to in these Letters Patent and making part of the same containing a Description in the words of the said James MacGregor Junr. himself of his Improvement, being a Machine for jointing, tongueing, grooving & planing plank for flooring houses & for other purposes.

---

* Disclaimer entered, 10 May 1839

Be it known that I James MacGregor Junr. of Wilton in the county of Saratoga & State of New York have invented a new & useful improvement in the Machine for jointing, tongueing, grooving & planing plank for flooring & sidings for ceiling which is described as follows—

1. The frame containing the jointing saws consists of four girths & two cast iron side pieces, fastened together by joint bolts passing through the sides, the top of this frame, is not quite as high as the top of the way hereafter described.

2. The frame containing the grooving & tongueing saws & plane (hereafter described) consists of two cast iron sides and six girths, three of these girths are above & three below the way.

From the girts above to those below are fixed studs on either side of the way to which are attached cross bars fitted for the way to rest on.

3. The way on which the timber traverses is [illegible] inches wide except between the jointing saws & between the saws for cutting the tongue & those that cut the groove at these places it is only four inches. In the top of this way, the whole distance is a groove for the chain to run in for carrying forward the plank between the saws— Forward of the jointing saws the way extends fifteen feet from the jointing saws to the tonguing & grooving saws, it is fifteen feet long, from this place to the wheel on which the chain goes back of the frame it is seven feet long.

This way must be secured on rests, so that it will not be liable to get out of place. Beyond the end of the machine the way is continued fourteen feet more.

4. The guages on the way to guide the plank, the guages on the side farthest from the plane shaft are made permanent & parallel with each other, the one forward of the jointing saw is a fourth of an inch farther from the centre of the way than the one after the jointing saw, the jointing saw is set to correspond with the gauge that is after it. Behind the saws that cut the tongue the gauge rests on top of the tongue to keep the plank from rising between the roller before, & the one after the plane, & against the main shoulder above the tongue, to guide the plank straight, this guage is sharp at the forward end & shaves off the edging that is above the tongue.

The guages on the other side are movable so as to suit any width of plank. In front of the jointing saw is a weight to keep the plank up to the stationary guage. Behind the jointing saw the guage is as thin as possible & used in a line with the saw. From the saws that cut the groove to the back part of the frame the shoulder of the guage is as thick as the under flange that forms one side of the groove the edge of this flange presses against the shoulder to guide the plank straight through the machine— Above this shoulder on the guage is a tongue that enters the groove to keep the plank from rising between the rollers.

5. The jointing is done by two circular saws, the one on the side farthest from the plane shaft is so placed as to cut the edge off

7730X in a line with the guage that lies immediately after it, the one on the
other side is placed in a moveable carriage operated by a graduating
screw so that it can be set to any width desired.
6th The tongue of the board is formed by four circular saws, the
two placed on the perpendicular shaft have a chuck between them
as thick as the intended tongue, this shaft is so placed that the
two saws cut horizontally into the edge of the plank as far as
the width of the intended tongue - Above and below the plank
is a shaft placed horizontally with one saw on each, the one
above cuts down to the cut made by the upper horizontal saw,
the one below cuts up to the lower cut made by the lower hori
zontal shaft; these two last mentioned shafts are so placed that
the saws cut into the face of the plank as far from the outer
edge as the tongue is designed to project.
7th The groove is formed by three circular saws placed on perpen
dicular shafts turning horizontally in the same carriage or frame
which carriage or frame is so constructed that it may be moved back
or forward by a regulating screw to suit any width of plank to be
dressed. On one of these shafts are put two circular saws, having
a chuck between them of such thickness that the saws from
outside to outside will be as far apart as the width of the intended
groove, the other shaft carries one saw made thicker than the two
just mentioned & so placed that it clears out the timber between
the cuts made by the before mentioned saws.
8. The revolving circular plane is made in the following manner. The
shaft is of cast iron with a cast steel step fitted in its lower end &
a cast steel bearing about six inches in length fitted in its upper
end to admit the shaft to rise & fall without disturbing the upper
box - Eight cast iron arms project from this shaft at the extrem
ities of these is a circular cast iron rim projecting three quarters of
an inch below the arms, even with the inner surface of which rim
is a flange projecting horizontally one & a half inch, the under
side of which flange & rim is turned true forming a smooth surface
D
to to pass freely over the plank to be planed— In this flange are certain
slots forming throats to admit the cutting edges of the plane irons.
at the back part of which slots are projections extending from the
top of the rim as far as the outer edge of the flange to which
they are cast solid having the same inclination as the irons, these
projections from the back part of the slots as well as the bed pie
ces on which the plane irons rest, & are fastened by screw bolts
& nuts— each plane iron is four inches long & two inches
wide, rounded on the outer corner the front edge passing throug.
the throat being nearly square; this edge the outer corner & up
the outer edge as far as the plank should ever exceed the de
sired thickness is made sharp.
To support this revolving plane a bar extends from one girt
to another directly under the centre of the shaft below the way
On this bar is fastened a box to receive the step placed at
the lower end of the revolving plane shaft— A plate form
ing the stationary part of this box is twelve inches long
four inches wide with a rise in the centre four inches high
& four inches in diameter, thro the centre of which is drilled
an aperture two inches in diameter in a line with the centre
of the shaft in this aperture is fitted a piece of metal having
a cavity in its upper end to admit the point of the shaft
& is made to rise & fall by a regulating screw to elevate or
depress the plane at pleasure; the side of the rise is tapped
& a screw fitted in so as to press against the side of the slide
to keep it stationary when required.
9. The feeding is performed by an endless chain passing over two
wheels one at the end of the frame in which the revolving plane
is placed & the other at the first end of the way, the first men
tioned wheel has cogs on its periphery working in the links of
the chain— On this chain are fastened hooks which lay hold of the end
of the plank on the chain carrying it forward to the saws & plane
10. Rollers for holding down the plank, there are three of these rollers, one placed in front of the jointing and tonguing saws, one
between these & the plane, & the other behind the plane all held down
upon the plank by weights & levers to confine the plank on the
way.

11. The pulleys & bands on each of the shafts of the saws & on the
shaft of the revolving plane is fixed a pulley.

Another pulley is put on the feed shaft lying across the
frame below the way— A pulley is fixed on a shaft at the after
end of the frame on this shaft is a small cog wheel working into a
large cog wheel on the shaft of the wheel carrying the endless
chain— A large pulley or drum & a loose pulley are placed under
the way & at right angles with it between the two frames— A band
passes around each pulley & around the large drum for driving the
jointing saws, tonguing & grooving saws and the revolving planes The band which drives the feeding pulley passes around a
small pulley on the shaft of the main drum— The driving pulley
is also placed on the shaft—

Operation The machine being put in motion by steam or water
power the plank to be dressed is placed on the way in front
of the jointing saws & carried forward by the motion of the end
less chain to these saws which joint its edges, it is then carried
forward to the tonguing & grooving saws passing under the
rollers between the guages where it is tongued and grooved
in the manner hereinbefore described, the endless chain then
carries it forward to the circular revolving planes when
it is planed smooth by the operation of the plane in the man
ner also herein before described.

The plank is then conducted out
of the machine by the continued motion of the endless chain
The jointing may be performed in a separate machine, also
the tonguing & grooving— And the planing likewise may be
done in a machine distinct from the others but all operate
on the same principles as herein described— Rollers may also be fixed before & and after the jointing saws, to keep the plank firmly down upon the way.

Now what I the said James MacGregor Junr. claim as my invention & for which I solicit Letters Patent from the Government of the United States is. 1. The planing of timber of any size or dimension by the principle of the turning tool & plane iron united as before described, or by the turning tool separate from the plane iron or so near as to retain the same principle. 2. The application of the sliding box for the step of the revolving plane shaft to turn in & by which the revolving plane is raised & lowered, to give the desired thickness to the planks made & applied as before described.

3. The passing the shaft thro beyond the face of the revolving circular plane so as to have a step for the plane to rest on 4. The application of the guage under the plane to keep the stuff down while the plane is operating, this may be done by a roller, but I prefer the guage. 5. The application of the common circular saw to joint tongue & groove plank or siding in the manner before described. 6. The mode of forming a tongue on a board plank or siding by cutting in the edge of the plank horizontally on each side of the tongue & then vertically to form the shoulders by circular saws as herein before described. 7. The mode of forming the groove by making two horizontal cuts in the edge of the plank with two circular saws as far apart & as deep as the width & depth of the intended groove & clearing out the timber between these cuts by a circular saw revolving horizontally in the manner herein described.

Further to illustrate my invention I refer to the model & Drawing of the same deposited in the Patent Office In Testimony whereof I hereunto subscribe my name this 19th day of August 1833

Witnesses

James MacGregor Junr.

William P Elliot
P. S. Loughborough } (Drw portfolio)

238